United States Patent
Dimitri et al.

(10) Patent No.: US 6,754,768 B2
(45) Date of Patent: Jun. 22, 2004

(54) LIBRARY OF HARD DISK DRIVES WITH TRANSPARENT EMULATING INTERFACE

(75) Inventors: Kamal E. Dimitri, Tucson, AZ (US); Robert G. Emberty, Tucson, AZ (US); Craig Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 09/844,127

(22) Filed: Apr. 26, 2001

(65) Prior Publication Data

US 2002/0161971 A1 Oct. 31, 2002

(51) Int. Cl.⁷ .............................................. G06F 12/02
(52) U.S. Cl. ................ 711/114; 369/30.28; 369/30.31; 369/30.38; 369/30.43; 369/30.46; 711/111; 711/202; 711/203; 711/206
(58) Field of Search ..................... 369/30.28, 30.31, 369/30.38, 30.43, 30.46; 711/111, 114, 202, 203, 206

(56) References Cited

U.S. PATENT DOCUMENTS

| | | |
|---|---|---|
| 4,170,031 A | 10/1979 | Beuch et al. |
| 4,761,785 A | 8/1988 | Clark et al. |
| 4,864,511 A | 9/1989 | Moy et al. |
| 5,123,000 A | 6/1992 | Fitzgerald et al. |
| 5,197,055 A | 3/1993 | Hartung et al. |
| 5,289,589 A * | 2/1994 | Bingham et al. ............ 710/316 |
| 5,377,121 A * | 12/1994 | Dimitri et al. ............... 700/218 |
| 5,423,046 A | 6/1995 | Nunnelley et al. |
| 5,638,347 A | 6/1997 | Baca et al. |
| 5,684,766 A * | 11/1997 | Inoue et al. .............. 369/30.63 |
| 5,875,063 A | 2/1999 | Corrington et al. |
| 5,915,081 A | 6/1999 | Yamamoto et al. |
| 5,970,030 A * | 10/1999 | Dimitri et al. ........... 369/30.46 |
| 5,983,357 A | 11/1999 | Sun |
| 6,005,745 A | 12/1999 | Filkins et al. |
| 6,022,180 A | 2/2000 | Motoyama et al. |
| 6,512,962 B2 * | 1/2003 | Dimitri et al. ............... 700/214 |

OTHER PUBLICATIONS

"The SCSI Bench Reference," p. 85, Copyright 1989, ENDL Publications.
"American National Standard for Information Technology—Fibre Channel—Single–Byte Command Code Sets Mapping Protocol (FC–SB)," ANSI X3, 271–1996, p. 19.

* cited by examiner

Primary Examiner—T Nguyen
(74) Attorney, Agent, or Firm—Durando Birdwell & Janke, PLC; Jean Bankley

(57) ABSTRACT

Disclosed is a library of hard disk drives with transparent emulating interface. The hard disk drives are shelved in associated storage locations in the library. A library controller translates the logical address of a requested hard disk drive known to the requesting host computer to a physical address or location within the library. A picker preferably mounts the requested disk drive to a destination receptacle which may be part of a backplane of the library, and the controller accesses the hard disk drive. Library operation is transparent to the host computer, the library emulating a selected type of storage device.

18 Claims, 7 Drawing Sheets

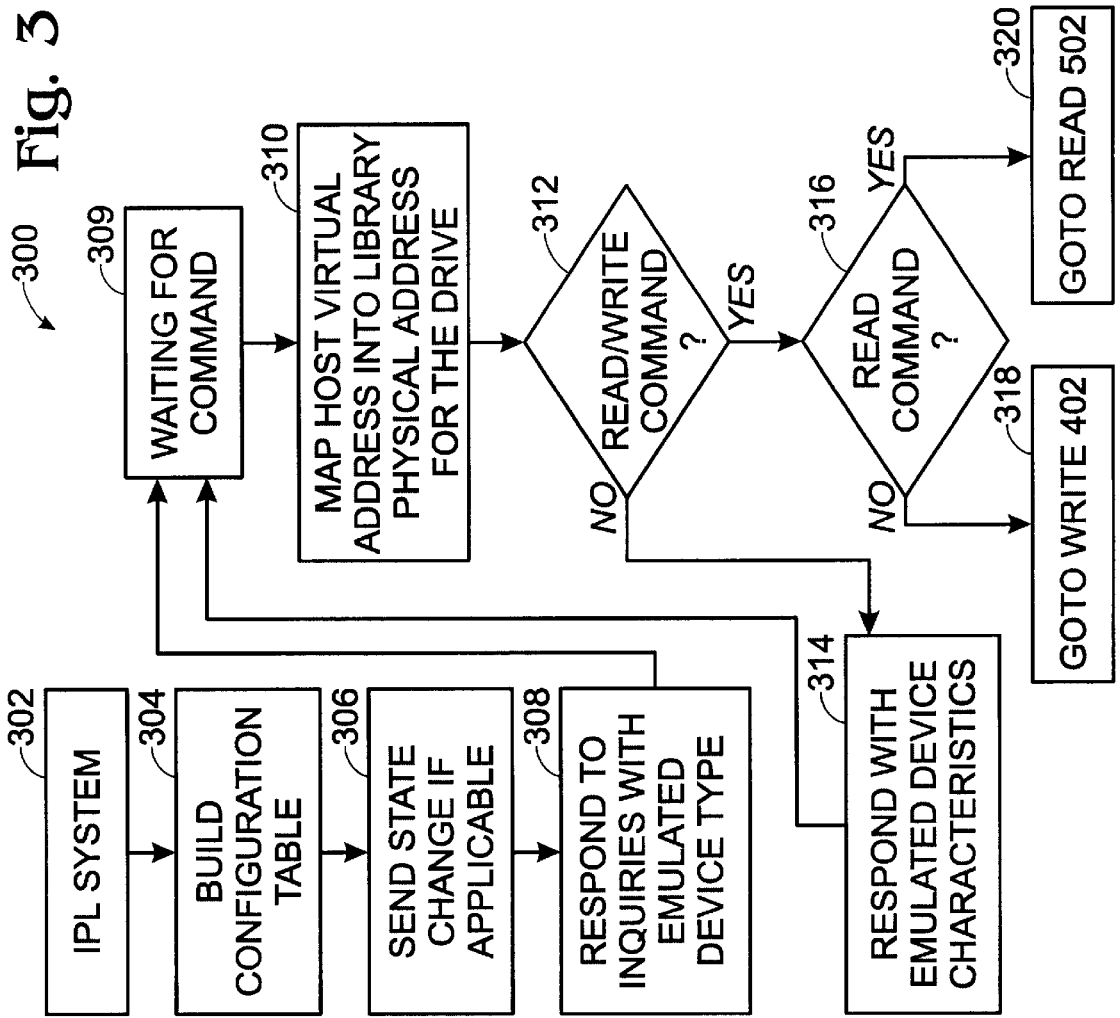
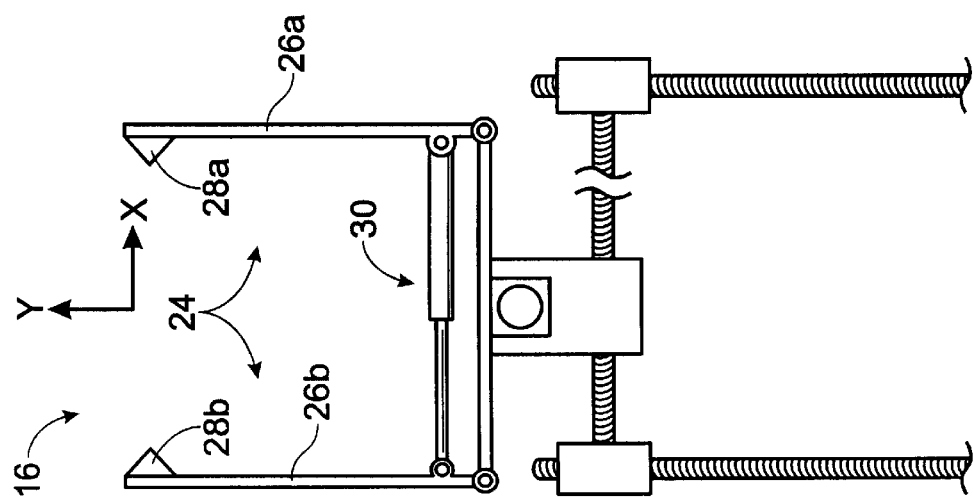

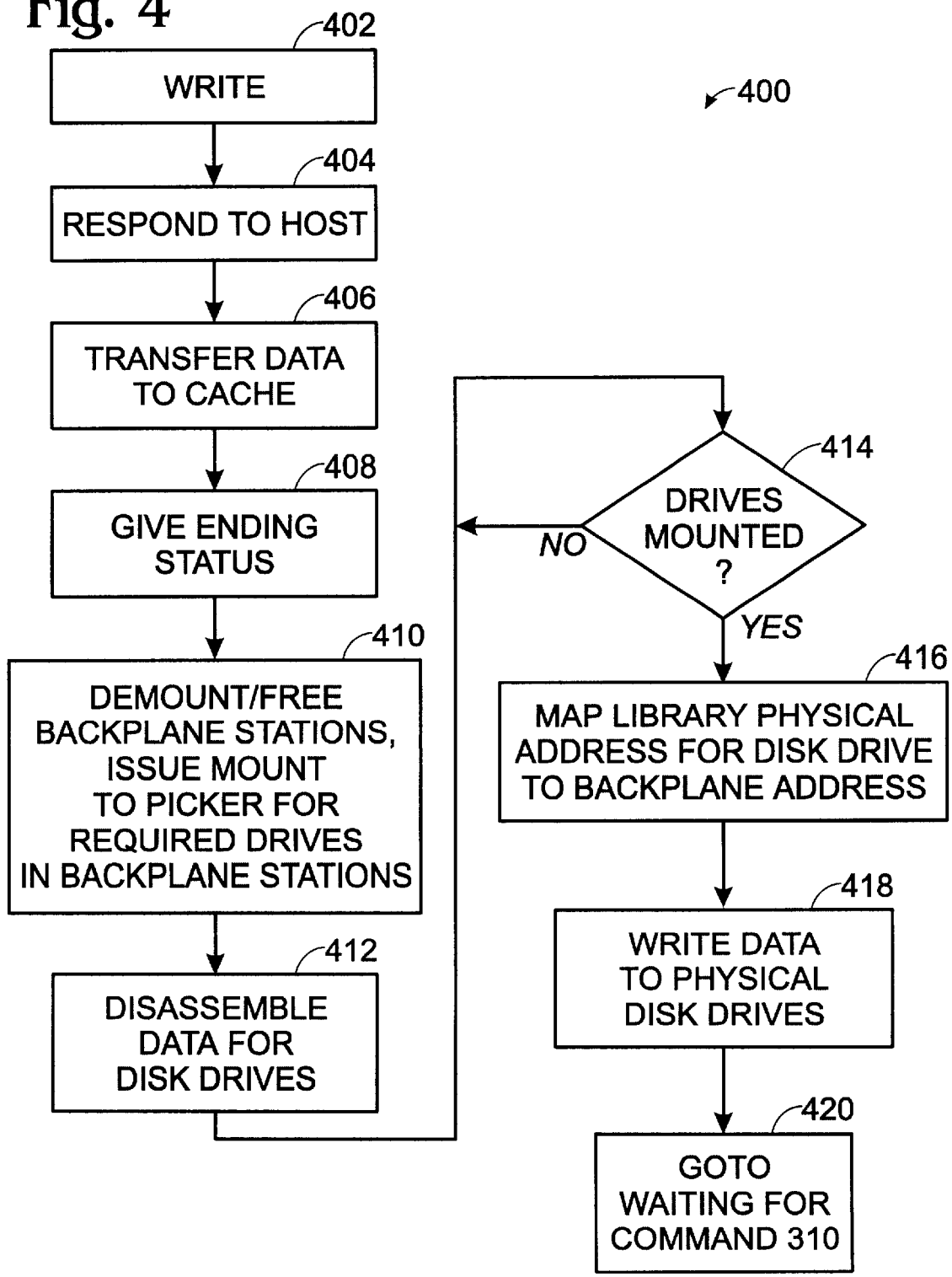

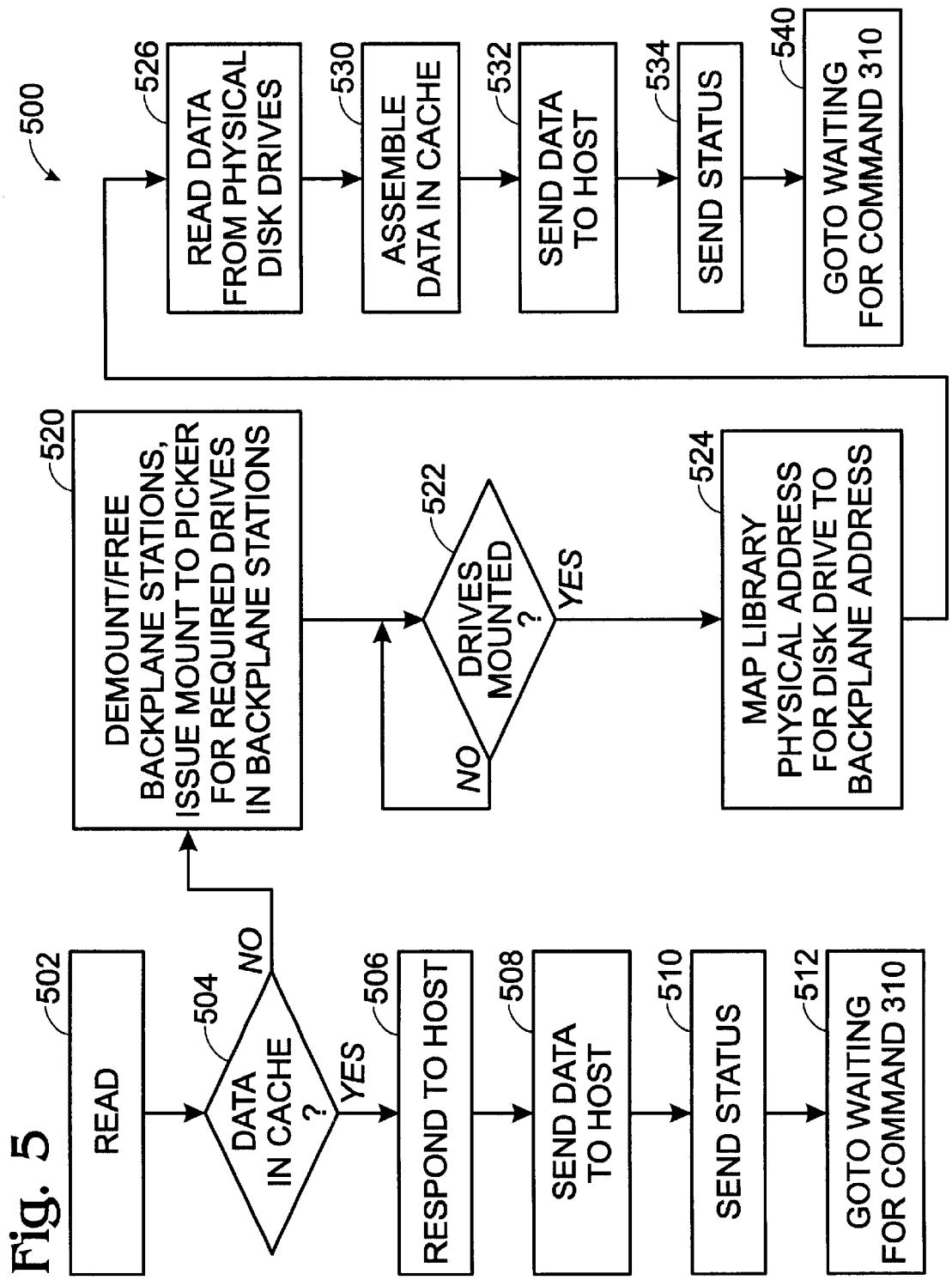

LIBRARY OF HARD DISK DRIVES WITH TRANSPARENT EMULATING INTERFACE

TECHNICAL FIELD

The present invention relates to a library of hard disk drives, such as for use as mass storage for mainframe or other host computers. More particularly, the invention relates to a library of hard disk drives with an interface for emulating other forms of mass storage so that manipulation and control of multiple hard disk drives in the library is transparent to the host computers.

BACKGROUND OF THE INVENTION

Large scale computing devices often employ stores of optical or tape storage media as part of a strategy for storing very large amounts of data at relatively low cost. The strategy may also provide redundancy to further improve performance and reliability. The optical or tape storage media is typically stored in a shelved space known in the art as a library. Individual storage units, such as optical discs or tape cassettes, are stored on dedicated shelves or in dedicated bins in the library. As such libraries were originally provided, a human operator would be signaled by a host computer to retrieve the storage unit from a particular shelf or bin and install the storage unit in a drive mechanism that is electrically coupled to the host computer, permitting the host computer to read from and write to the selected storage unit.

An improvement to the library replaced the human operator with a robotic picking mechanism. The picking mechanism or "picker" is adapted to grasp a memory storage medium and move the medium within the space of the library, carrying the medium between its place of origin and a destination. Such a picker for optical disk media is described in Dimitri et al., U.S. Pat. No. 5,377,121, which is herein incorporated by reference in its entirety.

Problems remain with the library as it is currently being practiced. Particularly, the optical media provides relatively slow reading and writing, while tape media provides relatively slow random access. Moreover, there is a need for providing communications with the library that render the internal operation of the library transparent to host computers accessing library resources. This may further call for the ability of the library to emulate some other form of mass storage with which the host computer is accustomed.

Accordingly, there is a need for a library of hard disk drives with transparent emulating interface that provides for decreasing the time required for reading data from and writing data to storage media in the library, that provides for transparent operation relative to one or more host computers requesting data, and that provides for emulating the characteristics of a selected storage device.

SUMMARY OF THE INVENTION

Disclosed is a library of hard disk drives with transparent emulating interface according to the present invention for coupling one or more of a plurality of hard disk drives to one or more host computers using the library. The hard disk drives are shelved in associated storage locations in the library. A library controller translates the logical address of a requested hard disk drive known to the requesting host computer to a physical address or location within the library. A picker preferably mounts the requested disk drive to a destination receptacle which may be part of a backplane of the library, and the controller accesses the hard disk drive. Library operation is transparent to the host computer, the library emulating a selected type of storage device.

Therefore, it is a principal object of the present invention to provide a novel and improved automated library of storage media.

It is another object of the present invention to provide a library of hard disk drives that provides for decreasing the time required for reading data from or writing data to storage media in the library.

It is still another object of the present invention to provide a library of hard disk drives with a transparent emulating interface that provides for transparent operation relative to one or more host computers requesting data.

It is yet another object of the present invention to provide a library of hard disk drives with transparent emulating interface that provides for emulating the characteristics of a selected storage device.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 2 is a pictorial schematic of a hard disk drive picker according to the present invention.

FIG. 3 is a flow chart of an I/O sort process for a library of hard disk drives with transparent emulating interface according to the present invention.

FIG. 4 is a flow chart of a write process for a library of hard disk drives with transparent emulating interface according to the present invention.

FIG. 5 is a flow chart of a read process for a library of hard disk drives with transparent emulating interface according to the present invention.

DETAILED DESCRIPTION OF A PREFERRED EMBODIMENT

Figure 1:
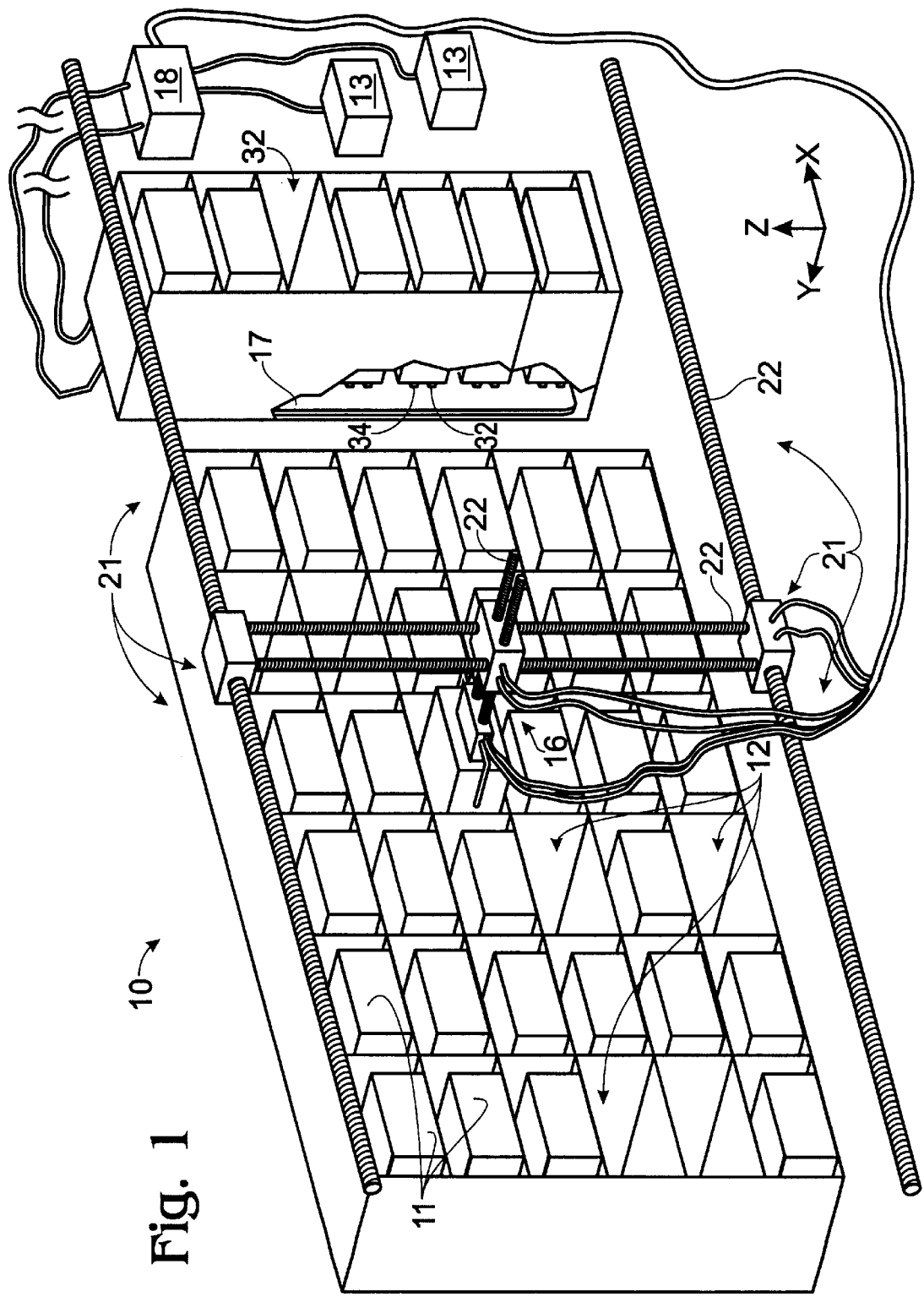
FIG. 1 is a partially cut-away, pictorial schematic of a library of hard disk drives and picker for use therein according to the present invention.

Referring to FIG. 1, a portion of a library 10 of hard disk drives 11 according to the present invention is shown. The library includes a number of storage locations (hereinafter "bins") 12 for shelving, containing, or otherwise storing as many or fewer hard disk drives units.

The hard disk drives 11 have magnetic hard disk media installed therein, so that the hard disk drives are fully functional computer memory elements. The hard disk drives require only power and input/output (hereinafter "I/O") connections to a host computer for reading the data on the hard disk media or for writing data thereto.

The library includes a library controller 18 that directs library resources and communicates with one or more host computers 13. The library controller includes a computer, which may be a general purpose computer, for executing program code as described more fully below. The library further includes a robotic picker 16 under the command of the controller. The picker 16 translates within the volume of the library by means of a translating mechanism 21 which typically employs an arrangement of lead screws 22 for translating the picker along each of three Cartesian axes independently. Translation in the x-z plane permits the picker to reach any selected storage bin 12 in the library, and to reach the destination receptacle. Translation in the y-direction permits the picker to move in and out with respect to the storage bins 12, for withdrawing the disk drive units from the storage bins, or for shelving the disk drive units therein.

Turning briefly to FIG. 2, the picker 16 includes a gripping element 24, which in the preferred embodiment comprises two arms 26a and 26b having respective end effectors 28a and 28b that are suitably adapted to engage complementary features in the disk drives. The arms 26 may be adapted to move toward or apart from one another by the action of a solenoid 30. The picker and gripping element may alternatively be implemented with a more general purpose programmable robotic device, or with other dedicated apparatus in ways that will be readily apparent to those of ordinary skill in the art.

Returning to FIG. 1, communications are established, by the controller, between the hard disk drives and one or more host computers 13 through a destination receptacle 17 which is typically though not necessarily part of a backplane of the library.

The destination receptacle 17 includes one or more power output connectors 32 adapted to mate with a complementary power input connector on each of the disk drives, and one or more I/O connectors 34 adapted to mate with a complementary I/O connector on the disk drives. The hard disk drives are repeatedly removable through use of these connectors in accord with the methodology of the library, which includes but is not limited to using the picker 16 to electrically couple or decouple a selected disk drive and the destination receptacle, to serve the memory needs of the host computers 13.

In a basic embodiment of the invention that is the subject of the present application, the picker does this by translating from its current location in the library to the storage bin corresponding to the selected disk drive unit, gripping the disk drive, withdrawing the disk drive from the storage bin, translating to the destination receptacle, and electrically interconnecting the disk drive and the destination receptacle.

The disk drives shelved in the library 10 have logical addresses which are known to the host computers, and physical addresses known to the controller that identify the current physical locations of the disk drives in the library. It is an advantage of the library strategy that the host computers need not know the physical addresses of the disk drives, and can view the library as a dedicated server, wherein the commands and movements within the library necessary to locate, obtain and mount a disk drive having a requested logical address are transparent to the host computers.

While each hard disk drive typically has a unique logical address, other logical addressing schemes may be employed without departing from the principles of the invention. For example, the disk drives can be identified by the host computers by one address, using what is known in the art as a Logical Block Address to partition the library, or using the Logical Unit Addressing features of FCP SCSI (Fibre Channel Protocol Small Computer Systems Interface).

Library operation presumes a prior physical introduction of hard disk drives (or other removable memory devices) into the library. A mail slot 23 (FIG. 7) is provided as a physical opening into the library through which the hard disk drives are passed to the picker, typically by a human operator.

Turning now to FIG. 3, an I/O sort process 300 for the library 10 including a transparent emulating interface according to the present invention is illustrated. The I/O sort process begins with an "initial program load" step 302, which boots the library controller 18 for carrying out the steps described below. The program code for step 302 is typically stored in an EPROM (Erasable Programmable Read Only Memory), a high-density floppy disk drive, a CD-ROM disk drive or the like.

In step 304 of the I/O sort process 300, the controller builds a "configuration table," which is a map or index of the physical addresses of the disk drives in the library corresponding to the logical addresses of the same drives by which the drives are known to the host computers.

As part of step 304, the picker 16 is commanded by the library controller to identify and shelve the disk drives 11 received through the mail slot. The disk drives preferably include externally accessible identifying indicia, such as may be coded on a label or in EPROM attached thereto that is scanned or read at the picker. Alternatively, the controller may instruct the picker to power up the disk drive and read identifying information coded on the disk itself. In any event, according to the invention, the controller learns the logical addresses of the disk drives and creates the configuration table as a result of shelving the drives. As can be readily appreciated, there may be more than one configuration table if multiple hosts are connected to the library.

With the configuration table constructed, the controller 18 is enabled to translate host requests from specified logical addresses to actual physical addresses, and instruct the picker to locate and mount the appropriate disk drive to an appropriate connector of the destination receptacle 17. In step 306, the configuration table is updated over time by the controller, as disk drives may be reshelved for a variety of reasons in different storage bins 12 than the storage bins in which they were initially stored or from which they were initially retrieved, and because disk drives may not currently be shelved but, rather, may already be mounted to the destination receptacle or currently in the possession of the picker.

The I/O sort process 300 continues with a step 308, wherein the library tells the host computers what device it is emulating. For example, the library may tell the host that it is a SCSI disk drive of a specified capacity, which may be of any size. The device or selected form of mass storage that the library is emulating establishes a handshaking protocol, for communicating with the host computer, which the library controller emulates so that the host computer communicates with the library controller as though the library is that device or selected form of mass storage.

In step 309, the controller 18 waits for a command from one of the host computers. The command will typically be accompanied by a logical address. Accordingly, in step 310, the logical address specified by the host is mapped by the library controller to the corresponding physical address in the library by consulting the configuration table as updated in step 306. In step 312, the controller determines whether the command is an I/O command. The library is adapted so that, if the command is not an I/O command, the library will respond to the command in the same way that the emulated device would respond to the command. Otherwise, the controller branches to a write process 400 for responding to a write command, or a read process 500 for responding to a read command.

Turning to FIG. 4, a preferred write process 400 for the library 10 with transparent emulating interface according to the invention is illustrated, that begins with receipt of a write command 402. In step 404, the library controller responds to the host computer to signal its readiness to receive the data, the physical address to which the data are to be written having previously been identified in step 310 of the I/O sort process 300. When the controller receives the data, in step 406, the controller preferably transfers the data immediately to solid state cache memory 38 (FIG. 7), which can be accessed much faster than the hard disk drives in the library, so that the host computer may disconnect from the library before the data is migrated out of cache to the hard disk drives. This cache may be battery backed-up or NVRAM (non-volatile random access memory) so that, if power to the library is lost, the cache will retain the data. In any event, in step 408, the controller signals the host that the data has been received.

In step 410, the controller determines whether the requested hard disk drive is already mounted. If not, the controller determines whether there is a free slot 32 (FIG. 1) for mounting the hard disk drive to the destination receptacle. If so, the requested hard disk drive is mounted in the free slot. If not, the least recently mounted or least frequently used hard disk drive is preferably selected to be demounted from the destination receptacle 17 to provide such a free slot for mounting the requested hard disk drive.

In an optional step 412 of the preferred write process 400, the data are disassembled for distribution over a RAID (Redundant Array of Independent Disks) or other form of distributed storage. Where distributed storage is to be used, the aforementioned step 410 is modified accordingly. Next, in step 414, the controller determines whether the picker has mounted the hard disk drive or drives. Once all of the drives are mounted to the destination receptacle 17, the controller performs another mapping, to update the physical address to indicate the slot in the destination receptacle in which the disk drive is mounted (step 416).

In step 418, with the hard disk drive or drives mounted, the controller spins the hard disk drives up to operating speed and writes the data. The process branches back to the I/O sort process 300 at step 310.

Turning to FIG. 5, a preferred read process 500 for the library 10 with transparent emulating interface according to the invention is illustrated, that begins with receipt of a read command 502. In step 504, the library preferably checks the cache memory 38 to determine whether the requested data are readily available. The controller may anticipate the need for particular data based on the history of data requests for the particular host or the hosts generally and place the particular data in cache in advance of the read command. If the data are in cache, the controller simply informs the host that it is ready to send the data (step 506), sends the data (step 508), and sends an indication to the host that the data has been sent (step 510), before returning to the I/O sort process 300 at step 310.

On the other hand, if the data are not available in cache, the controller (step 520) determines whether the requested hard disk drive is already mounted. If not, the controller determines whether there is a free slot 32 (FIG. 1) for mounting the hard disk drive to the destination receptacle. If so, the requested hard disk drive is mounted in the free slot. If not, the least recently mounted or least frequently used hard disk drive is preferably selected to be demounted from the destination receptacle 17 to provide such a free slot for mounting the requested hard disk drive.

Next, in step 522, the controller determines whether the picker has mounted the hard disk drive or drives. Once all of the drives are mounted to the destination receptacle 17, the controller performs another mapping, to update the physical address to indicate the slot in the destination receptacle in which the disk drive is mounted (step 524).

In step 526, with the hard disk drive or drives mounted, the controller spins the hard disk drives up to operating speed and reads the data. If the data are read from distributed storage as mentioned above, the data are preferably assembled in the cache 38 (step 530), and the aforementioned step 520 is modified accordingly. The controller then sends the data to the host (step 532), and sends an indication to the host that the data has been sent (step 534), before returning to the I/O sort process 300 at step 310.

The controller 18 communicates with the host computers 13 using a communications interface 19 which may be implemented in wires or optical fibers, or which may be wireless. Preferably, the interface 19 makes use of a protocol known as a fibre channel arbitrated loop, specified by ANSI X3.230-1994, X3.297-1997, and X3.303-1998, each incorporated by reference herein. The fibre channel loop is implemented as a lower layer protocol that effectuates the transmission of data as frames. It can support any desired upper layer protocol for interpreting the data in the frames, such as but not limited to FCP SCSI or FICON (Fibre Connection), without the need for specialized hardware. For example, the library controller can act as a set of servers, a set of SCSI hard disks, a FICON storage subsystem, or a combination of these.

As an outstanding feature of the invention, a command/protocol translation table is provided for use by the controller 19 that permits the controller to associate a plurality of commands for a given emulated device and a number of alternative communications protocols, such as SCSI and the fibre channel arbitration loop. The controller may identify the command by identifying the protocol.

In turn, a command/code translation table is provided for associating the various commands with associated microcode particularly adapted for controlling respective memory elements in the library, as selected by the controller, to execute the command transparently to the host. The controller selects the library resource and the appropriate microcode is identified and executed to carry out the host command in the library.

The command/protocol and command/code tables are only exemplary of associations or references made according to the present invention. Such look-up tables may be implemented in any manner known in the art, and the tables need note be maintained or employed separately.

As an example of a translation according to the present invention, the library may emulate a hard drive device on a SCSI interface 19. If the host sends a data packet with hexadecimal 2A (or "2Ah"), the controller 18 interprets the command as a write command, reformats the command into a format for use internally in the library, and writes the data to any selected library resource such as one or more hard disk drives. If a "28h" is received, the controller interprets the command as a read command, reads the desired data from the selected library resource, formats the data as a SCSI data packet and sends the data to the host. If a "03h" is received, the controller interprets the command as a "sense" command, which is an example of a non-I/O command. The controller carries out the commands with its own internal command and control protocol and replies to the host in the emulating format.

Similarly, if the library is emulating a hard disk drive on a fibre channel arbitrated loop and the host sends a data packet with "MMMMMM01" appended, where the "M's" represent modifier bits, the controller 18 interprets the command as a write command, if a "MMMMMM10" is received, the controller interprets the command as a read command, and if a "MMMM0100" is received, the controller interprets the command as a sense command. Again, the controller responds to the host in the emulating format.

The library may also emulate one device to one host and one device to another host, and it may even emulate one protocol to one host and another protocol to another host provided that the respective hosts are attached to the library through different protocols by the interface 19. It is an outstanding feature of the invention that the controller is multi-lingual without any need to change the controller's operating microcode. Accordingly, the library may communicate in a variety of different ways with a variety of different hosts on demand.

Figure 6:
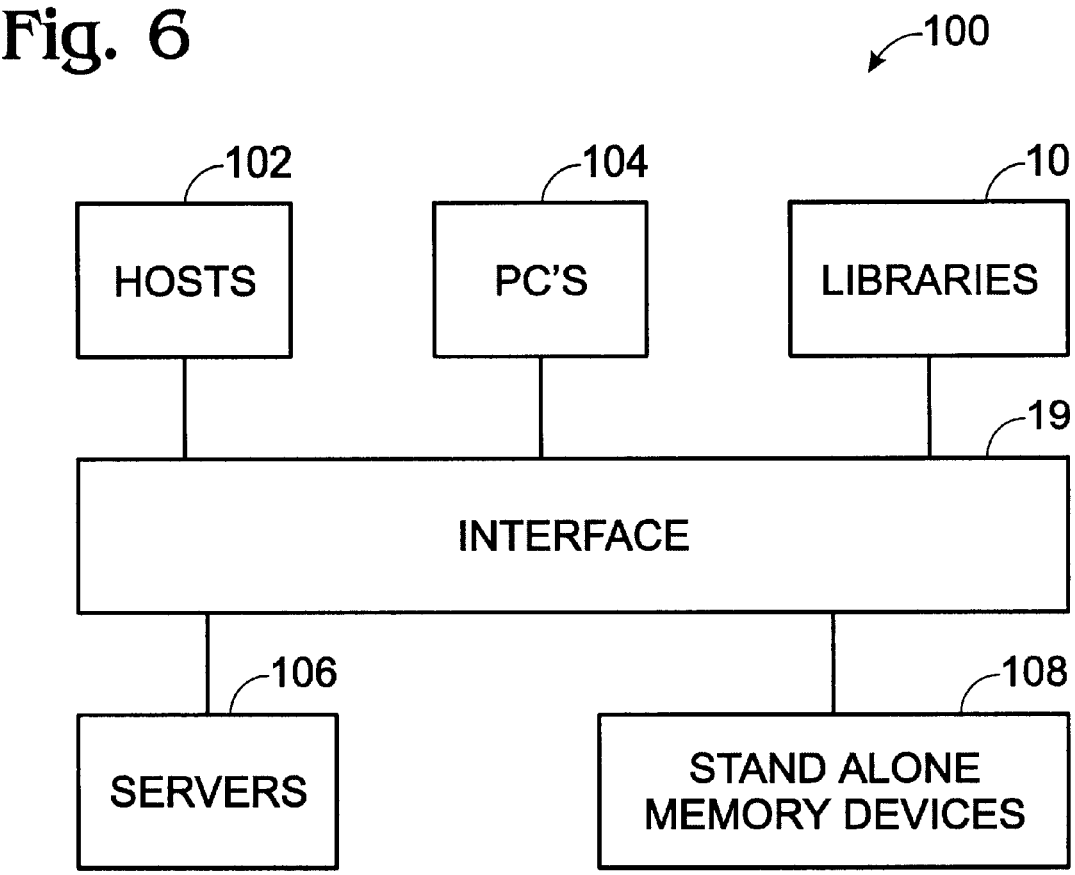
FIG. 6 is a block diagram of a storage area network according to the present invention, including one or more libraries according to the present invention.

Turning to FIG. 6, the library 10 with transparent emulating interface may be part of a larger storage area network 100. One or more libraries 10 may share data through a communications interface 19 with each other, with mainframe computers 102, with other host computers such as personal computers 104 and servers 106, and with stand-alone memory devices such as stand-alone disk drives 108. Typically, where the libraries are large distances apart, such as at least one kilometer, each library would communicate locally through its own fibre channel arbitrated loop, the loops each being switchably connected to a larger intermediate network known in the art as a fabric.

Figure 7:
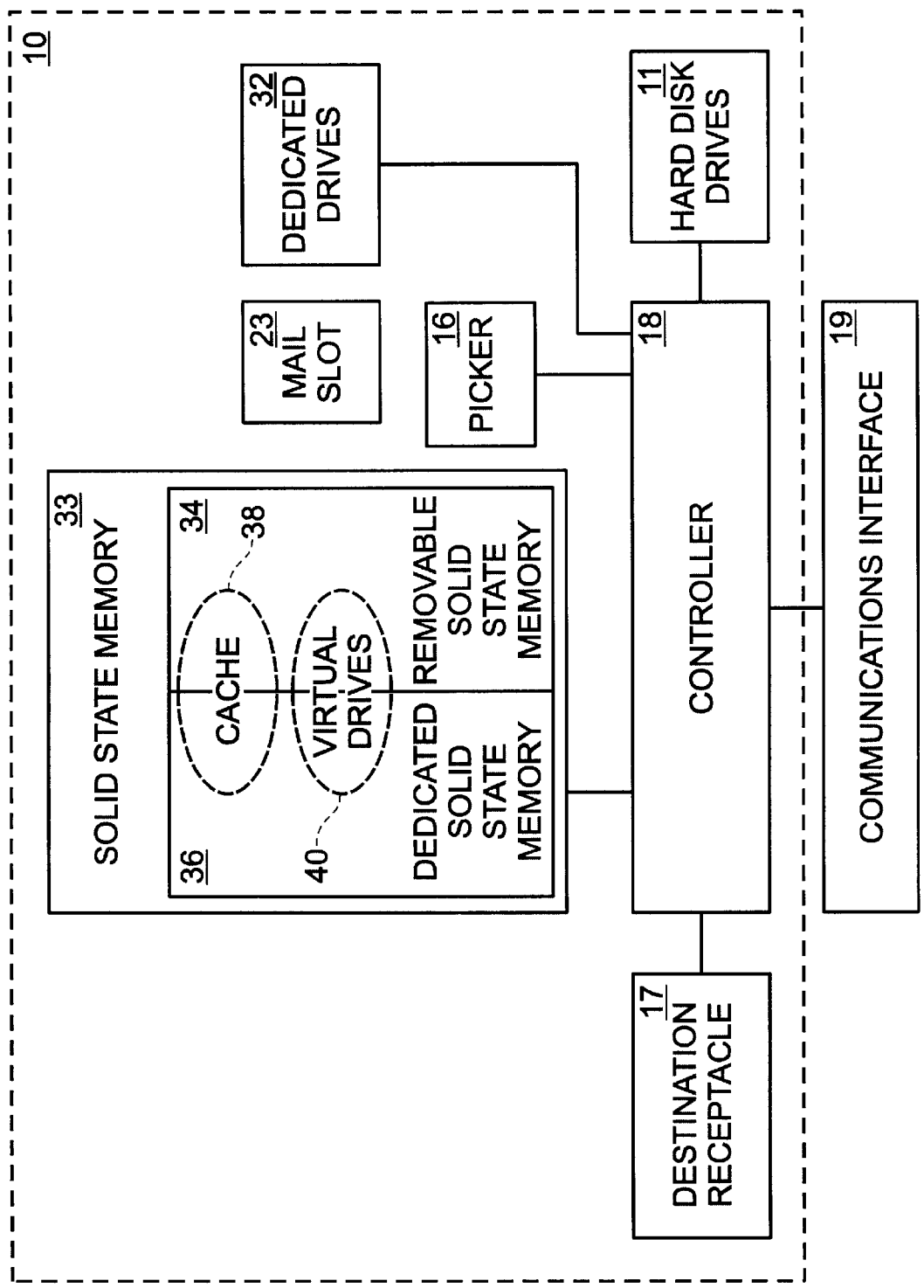
FIG. 7 is a block diagram of a library of hard disk drives according to the present invention, showing additional elements.

Turning to FIG. 7, the library 10 may include additional elements or devices. For example, while some or most of the hard disk drives in the library may be repeatedly removable hard disk drives as described above, other, dedicated hard disk drives 32 may be provided in the library that are left attached to the backplane, in anticipation of a more continuous I/O workload. Connectors used to connect the dedicated drives to the backplane therefore need not be particularly adapted for repeated removals and insertions.

The library may include solid state memory 33, which in turn may include removable solid state memory 34 and dedicated solid state memory 36. For removable solid state memory, solid state memory cards or other convenient physical forms of the solid state memory are provided which the picker may grip and move in the same manner as the removable hard disk drives. Alternatively, an additional picker may be provided in the library that is particularly adapted for gripping and moving the solid state memory. The solid state memory is preferably provided to be repeatedly removable from the destination receptacle through the use of suitable connectors as for the removable hard drives.

Similar to the dedicated hard drives, dedicated solid state memory is permanently connected to the backplane, i.e., without the use of connectors to facilitate repeated removals and insertions of the hard disk drives, in anticipation of a more continuous I/O workload.

Either or both removable and dedicated solid state memory may be organized as a either or both cache 38 and one or more virtual hard disk drives 40. The use of cache 38 has been illustrated above in connection with the preferred read and write processes. To implement virtual hard disk drives, the controller is adapted to translate hard disk drive read and write commands to the analogous commands necessary to read from or write to the solid state memory, as will be readily appreciated.

The solid state memory 33 may also be employed to facilitate what is known as "softcopy passthrough," such as by use of Extended Remote Copy ("XRC") and Peer-to-Peer Remote Copy ("PPRC") software. Softcopy passthrough may be used, e.g., for reproducing selected data resident in one library for storage in another library, such as in the storage area network 100 discussed above.

Figure 8:
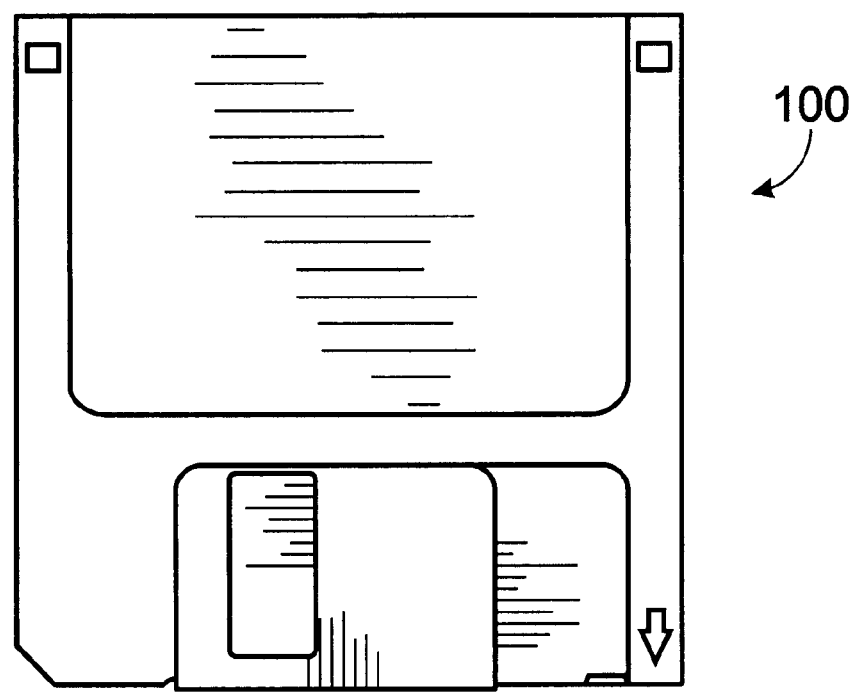
FIG. 8 is a pictorial view of an article of manufacture according to the present invention.

Turning to FIG. 8, an article of manufacture 100 is shown which tangibly embodies one or more programs of executable computer instructions for causing the controller 18 to perform steps according to the present invention is shown. For example, the article of manufacture 100 may be used to store coding for the steps described in connection with the I/O sort process 300, write process 400 and read process 500. The article of manufacture 100 is shown as a floppy disk; however, any other computer readable storage medium may be employed without departing from the principles of the invention.

It is to be recognized that, while a particular library of hard disk drives with transparent emulating interface has been shown and described as preferred, other configurations and methods could be utilized, in addition to those already mentioned, without departing from the principles of the invention. Some of these are the subjects of other patent applications which cite the present application and incorporate its teachings by reference. For example, the picker 16 may travel to a storage bin and, rather than retrieving a hard disk drive therein for carrying the hard disk drive to the destination receptacle 17, the picker may merely make contact with the hard disk drive, by carrying an interconnection with the destination receptacle 17 and by being adapted to power up and operate the hard disk drive at the storage bin.

It is to be further recognized that processes and methods according to the invention may be implemented as articles of manufacture by using standard techniques to produce computer-readable storage media, such as computer software, firmware and hardware, tangibly embodying programs of executable computer instructions in memory or transmitting devices. Examples of such memory devices are hard disk drives, floppy diskettes, optical disks, magnetic tape, and semiconductor memories such as ROM (Read Only Memory), PROM (Programmable Read Only Memory) and EPROM, and examples of such transmitting devices are the Internet, electronic bulletin boards and message/note exchanges, networks including telephone/modem, cable and cellular networks, radio and satellite communications systems, and other stationary or mobile systems and communications links. One skilled in the art of computer science will easily be able to implement any process or method according to the invention with a general purpose computer as described herein or with or in combination with more specialized hardware.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method for accessing a disk drive in a library of hard disk drives, comprising the steps of:
   (a) representing to a host computer that the library is a predetermined selected form of mass storage, said selected form of mass storage defining a handshaking protocol with said host computer;
   (b) receiving a command from the host computer and a logical address for a hard disk drive to which said command pertains;
   (c) consulting a predetermined index associating said logical address with a physical address within the library;
   (d) translating said logical address to said physical address;
   (e) locating the hard disk drive corresponding to said physical address;
   (f) where said hard disk drive is in a storage bin, retrieving said hard disk drive from said storage bin, translating said hard disk drive to a destination receptacle for coupling the hard disk drive to the host computer, electrically interconnecting said hard disk drive and said destination receptacle, and performing said command;
   (g) carrying out said command by handshaking with said host computer according to said handshaking protocol, wherein steps (c)–(f) are thereby transparent to the host computer; and
   (h) if said command is to write data, disassembling said data for distribution over at least two hard disk drives.

2. The method of claim 1, wherein said at least two hard disk drives are operated as a RAID.

3. A method for accessing a disk drive in a library of hard disk drives, comprising the steps of:
   (a) representing to a host computer that the library is a predetermined selected form of mass storage, said selected form of mass storage defining a handshaking protocol with said host computer;
   (b) receiving a command from the host computer and a logical address for a hard disk drive to which said command pertains;
   (c) consulting a predetermined index associating said logical address with a physical address within the library;
   (d) translating said logical address to said physical address;
   (e) locating the hard disk drive corresponding to said physical address;
   (f) where said hard disk drive is in a storage bin, retrieving said hard disk drive from said storage bin, translating said hard disk drive to a destination receptacle for coupling the hard disk drive to the host computer, electrically interconnecting said hard disk drive and said destination receptacle, and performing said command;
   (g) carrying out said command by handshaking with said host computer according to said handshaking protocol, wherein steps (c)–(f) are thereby transparent to the host computer; and
   (h) if said command is to read data, assembling said data from at least two hard disk drives.

4. The method of claim 3, wherein said at least two hard disk drives are operated as a RAID.

5. An article of manufacture for use in a library of hard disk drives including a library controller, said article of manufacture comprising a computer-readable storage medium tangibly embodying a program of executable computer instructions which cause said controller to perform steps comprising:
   (a) representing to a host computer that the library is a predetermined selected form of mass storage, said selected form of mass storage defining a handshaking protocol with said host computer;
   (b) receiving an I/O command from the host computer and a logical address for a hard disk drive to which said command pertains;
   (c) consulting a predetermined index associating said logical address with a physical address within the library;
   (d) translating said logical address to said physical address;
   (e) locating the hard disk drive corresponding to said physical address;
   (f) where said hard disk drive is in a storage bin, retrieving said hard disk drive from said storage bin, translating said hard disk drive to a destination receptacle for coupling the hard disk drive to the host computer, electrically interconnecting said hard disk drive and said destination receptacle, and performing said command;
   (g) carrying out said command by handshaking with said host computer according to said handshaking protocol, wherein steps (c)–(f) are thereby transparent to the host computer; and
   (h) if said command is to write data, said program of computer instructions may cause said library controller to disassemble said data for distribution over at least two hard disk drives.

6. The article of manufacture of claim 5, wherein said program of computer instructions may cause said library controller to operate said at least two hard disk drives as a RAID.

7. An article of manufacture for use in a library of hard disk drives including a library controller, said article of manufacture comprising a computer-readable storage medium tangibly embodying a program of executable computer instructions which cause said controller to perform steps comprising:
   (a) representing to a host computer that the library is a predetermined selected form of mass storage, said selected form of mass storage defining a handshaking protocol with said host computer;
   (b) receiving an I/O command from the host computer and a logical address for a hard disk drive to which said command pertains;
   (c) consulting a predetermined index associating said logical address with a physical address within the library;
   (d) translating said logical address to said physical address;
   (e) locating the hard disk drive corresponding to said physical address;
   (f) where said hard disk drive is in a storage bin, retrieving said hard disk drive from said storage bin, translating said hard disk drive to a destination receptacle for coupling the hard disk drive to the host computer, electrically interconnecting said hard disk drive and said command;
   (g) carrying out said command by handshaking with said host computer according to said handshaking protocol, wherein steps (c)–(f) are thereby transparent to the host computer; and (h) if said command is to read data, said program of computer instructions may cause said library controller to assemble said data from at least two hard disk drives.

8. The article of manufacture of claim 7, wherein said program of computer instructions may cause said library controller to operate said at least two hard disk drives as a RAID.

9. A method for communicating between one or more host computers and a library of one or more types of memory elements controlled by a library controller, comprising the steps of:

forming a first association of a plurality of commands for instructing a predetermined type of memory element and a plurality of protocols;

forming a second association of said plurality of commands and a plurality of codes particularly adapted for controlling respective memory elements in the library;

receiving a command from a host computer according to one of said protocols for instructing said device;

identifying said protocol;

identifying said command by consulting said first association;

selecting, by the controller, one or more of the memory elements in the library for carrying out the command;

identifying the associated said code by consulting said second association for said selected memory elements; and executing the identified code for carrying out the command in the library with said selected memory elements.

10. The method of claim 9, wherein said step of executing the identified code further comprises reading data from a hard disk drive in the library, formatting said data according to the identified said protocol, and thereafter sending said data to the host computer.

11. The method of claim 9, wherein said step of executing the identified code further comprises writing to a hard disk drive in the library.

12. An article of manufacture for use in communicating between one or more host computers and a library of one or more types of memory elements controlled by a library controller, said article of manufacture comprising a computer-readable storage medium tangibly embodying a program of executable computer instructions which cause said controller to perform steps comprising:

forming a first association of a plurality of commands for instructing a predetermined type of memory element and a plurality of protocols;

forming a second association of said plurality of commands and a plurality of codes particularly adapted for controlling respective memory elements in the library;

receiving a command from a host computer according to one of said protocols for instructing said device;

identifying said protocol;

identifying said command by consulting said first association;

selecting, by the controller, one or more of the memory elements in the library for carrying out the command;

identifying the associated said code by consulting said second association for said selected memory elements;

executing the identified code for carrying out the command in the library with said selected memory elements.

13. The article of manufacture of claim 12, wherein said program of computer instructions may cause said library controller to execute the identified code at least by reading data from a hard disk drive in the library, formatting said data according to the identified said protocol, and thereafter sending said data to the host computer.

14. The article of manufacture of claim 12, wherein said program of computer instructions may cause said library controller to execute the identified code at least by writing to a hard disk drive in the library.

15. A storage area network, comprising:

a first library of memory elements comprising hard disk drives for use by one or more host computers, wherein a requesting host computer may request access to any selected hard disk drive in the library by providing a logical address identifying the selected hard disk drive, said first library including a first controller for controlling said first library and for communicating with the one or more host computers;

a second library of memory elements comprising hard disk drives for use by said one or more host computers, wherein a requesting host computer nay request access to any selected hard disk drive in the library by providing a logical address identifying the selected hard disk drive, said second library including a second controller for controlling said second library and for communicating with the one or more host computers, wherein said first library and said second library are separated by at least one kilometer; and a first fibre-channel arbitrated loop communications link between said first controller and at least some of the one or more host computers, and a second fibre-channel arbitrated loop communications link between at least some other of the one or more host computers, wherein said first and said second fibre-channel arbitrated loop communication links are each switchably connected to a third communications link between said first and said second controller.

16. The storage area network of claim 15, wherein the host computers comprise at least two different types of devices selected from the following: main frame computers, personal computers, servers and stand alone memory devices.

17. A method for area network storage, comprising the steps of:

providing a first library of memory elements comprising hard disk drives for use by one or more host computers, wherein a requesting host computer may request access to any selected hard disk drive in the library by providing a logical address identifying the selected hard disk drive, said first library including a first controller for controlling said first library and for communicating with the one or more host computers;

providing a second library of memory elements comprising hard disk drives for use by said one or more host computers, wherein a requesting host computer may request access to any selected hard disk drive in the library by providing a logical address identifying the selected hard disk drive, said second library including a second controller for controlling said second library and for communicating with the one or more host computers, wherein said first library and said second library are separated by at least one kilometer;

providing a first communications link between said first controller and at least some of the one or more host computers;

providing a second communications link between at least some other of the one or more host computers;

providing a third communications link between said first and second controller;

operating said first communications link according to a fibre channel arbitrated loop protocol; and operating said second communications link according to a fibre channel arbitrated loop protocol.

18. The method of claim 17, further comprising operating said third communications link according to a protocol which is not a fibre channel arbitrated loop protocol.

* * * * *